(12) United States Patent
Klein et al.

(10) Patent No.: US 7,460,509 B2
(45) Date of Patent: Dec. 2, 2008

(54) METHOD AND APPARATUS FOR ISOCHRONOUS DATAGRAM DELIVERY OVER CONTENTION-BASED DATA LINK

(75) Inventors: Tony J. Klein, St. Paul, MN (US); Jeff Stern, Chanhassen, MN (US)

(73) Assignee: Motorola, Inc., Schaumburg, IL (US)

( * ) Notice: Subject to any disclaimer, the term of this patent is extended or adjusted under 35 U.S.C. 154(b) by 594 days.

(21) Appl. No.: 11/073,007

(22) Filed: Mar. 4, 2005

(65) Prior Publication Data

US 2005/0195828 A1    Sep. 8, 2005

Related U.S. Application Data

(60) Provisional application No. 60/550,722, filed on Mar. 5, 2004.

(51) Int. Cl.
*H04Q 7/24* (2006.01)
(52) U.S. Cl. .................. 370/338; 370/210; 370/346; 370/252
(58) Field of Classification Search ........... None
See application file for complete search history.

(56) References Cited

U.S. PATENT DOCUMENTS

| | | | |
|---|---|---|---|
| 5,574,934 A * | 11/1996 | Mirashrafi et al. | 709/207 |
| 5,742,847 A | 4/1998 | Knoll et al. | |
| 6,161,138 A * | 12/2000 | Gross et al. | 709/225 |
| 6,259,689 B1 | 7/2001 | Wethington et al. | |
| 6,625,204 B1 | 9/2003 | Abramson et al. | |
| 6,633,564 B1 * | 10/2003 | Steer et al. | 370/389 |
| 6,640,248 B1 | 10/2003 | Jorgensen | |
| 2001/0043573 A1 | 11/2001 | Kelly | |
| 2001/0043574 A1 | 11/2001 | Nguyen et al. | |
| 2001/0043575 A1 | 11/2001 | Kelly | |
| 2001/0045908 A1 | 11/2001 | Kelly et al. | |
| 2001/0048669 A1 | 12/2001 | Kelly et al. | |
| 2001/0048671 A1 | 12/2001 | Kelly et al. | |
| 2001/0049670 A1 | 12/2001 | Kelly et al. | |
| 2002/0000931 A1 | 1/2002 | Petronic et al. | |
| 2002/0004369 A1 | 1/2002 | Kelly et al. | |

(Continued)

OTHER PUBLICATIONS

Sater et al., "Media Access Control Layer Proposal for the 802.16 Air Interface Specification," IEEE 802.16 Broadband Wireless Access Working Group, Apr. 14, 2000, pp. 1-298.

(Continued)

*Primary Examiner*—Duc C Ho

(57) ABSTRACT

A contention-based datalink couples a receiving station and a plurality of sending stations. A first sending station has established a communication session with the receiving station. If a second one of the plurality of sending stations requests a call setup for a higher priority low-latency transmission, the receiving station sends a poll to the second sending station. The poll causes the first sending station to temporarily suspend its transmission activities and permits the second sending station to transmit a real time protocol (RTP) datagram. Upon completion of transmission from the second sending station, the suspended transmission from the first sending station resumes in a transparent fashion. The receiving station controls transmission rate by sending poll requests at intervals determined by a data value transmitted from sending station. Within the sending station, datagrams in an output queue are monitored and polling rate varied so as to maintain the number of datagrams in the output queue at an optimal level.

41 Claims, 11 Drawing Sheets

U.S. PATENT DOCUMENTS

| | | | |
|---|---|---|---|
| 2002/0009058 A1 | 1/2002 | Kelly et al. |
| 2002/0015424 A1 | 2/2002 | Preston et al. |
| 2002/0051435 A1 | 5/2002 | Giallorenzi |
| 2002/0051438 A1 | 5/2002 | Ertel et al. |
| 2002/0051462 A1 | 5/2002 | Ertel et al. |
| 2002/0055351 A1 | 5/2002 | Elsey et al. |
| 2002/0067759 A1 | 6/2002 | Ertel et al. |
| 2002/0071384 A1 | 6/2002 | Hall et al. |
| 2002/0071479 A1 | 6/2002 | Giallorenzi |
| 2002/0093924 A1 | 7/2002 | Preston et al. |
| 2002/0093990 A1 | 7/2002 | Preston et al. |
| 2002/0097703 A1 | 7/2002 | Nieczyporowicz |
| 2002/0097706 A1 | 7/2002 | Preston et al. |
| 2002/0099854 A1 | 7/2002 | Jorgensen |
| 2002/0126850 A1 | 9/2002 | Hall et al. |
| 2002/0131375 A1 | 9/2002 | Vogel et al. |
| 2002/0136168 A1 | 9/2002 | Struhsaker et al. |
| 2002/0136169 A1 | 9/2002 | Struhsaker et al. |
| 2002/0136170 A1 | 9/2002 | Struhsaker |
| 2002/0141355 A1 | 10/2002 | Struhsaker et al. |
| 2002/0141587 A1 | 10/2002 | Ertel et al. |
| 2002/0146060 A1 | 10/2002 | Ertel et al. |
| 2002/0158797 A1 | 10/2002 | Kelly et al. |
| 2002/0172180 A1 | 11/2002 | Hall |
| 2002/0172193 A1 | 11/2002 | Preston et al. |
| 2002/0181446 A1 | 12/2002 | Preston et al. |
| 2003/0050015 A1 | 3/2003 | Kelly et al. |
| 2003/0058810 A1 | 3/2003 | Petronic |
| 2003/0067903 A1 | 4/2003 | Jorgensen |
| 2003/0088366 A1 | 5/2003 | Branlund |
| 2003/0112878 A1 | 6/2003 | Kloper |
| 2003/0161284 A1 | 8/2003 | Chen |
| 2003/0186694 A1 | 10/2003 | Sayers |
| 2003/0223750 A1 | 12/2003 | Farmer |
| 2004/0033780 A1 | 2/2004 | Kelly |
| 2007/0058581 A1* | 3/2007 | Benveniste .................. 370/328 |

OTHER PUBLICATIONS

Eklund, Carl, et al., "IEEE Standard 802.16: A Technical Overview of the WirelessMAN Air Interface for Broadband Wireless Access", *IEEE Communications Magazine, IEEE Service Center*, vol. 40. No. 6, Piscataway, NJ, (Jun. 6, 202),97-107.

Guosong, Chu, et al., "A QoS Architecture for the MAC Protocol of IEEE 802.16 BWA System", *Communications, Circuits and Systems and West Sino Expositions, IEEE 2002 International Conference*, vol. 1, Piscataway, NJ, (Jun. 29-Jul. 1, 2002),435-439.

Koffman, Israel, et al., "Broadband Wireless Access Solutions Based on OFDM Access in IEEE 802.16", *IEEE Communications Magazine, IEEE Service Center*, vol. 40. No. 4, Pitscataway, NJ, (Apr 2002),96-103.

Wongthavarawat, Kitti, et al., "IEEE 802.16 Based Last Mile Broadband Wireless Militar", *2003 IEEE Communications Conference; MILCOM 2003*; vol. 2 of 2, Boston, MA, (Oct. 13-16 2003), 779-784.

\* cited by examiner

METHOD AND APPARATUS FOR ISOCHRONOUS DATAGRAM DELIVERY OVER CONTENTION-BASED DATA LINK

BACKGROUND OF THE INVENTION

1. Field of the Invention

The present invention is directed generally to communication systems and, more particularly, to method an apparatus for delivery of isochronous datagram delivery in a contention-based data communication system.

2. Description of the Related Art

Packet data communication systems are well known in the art. An example of a packet-based communication system is the Internet. A data message is broken into multiple data packets and transmitted on the communication system along with delivery address data and packet numbering data. The multiple data packets, which may be referred to as datagrams, may be transmitted over one or more communication pathways to the destination indicated by the destination address associated with each datagram. The datagrams are reassembled and delivered to the destination address.

Certain applications, such as email, are generally not time-sensitive. These applications will tolerate high-latency. That is, delays in transmission of the individual datagrams does not adversely affect the overall quality of service (QoS).

Other applications, such as voice over Internet protocol (VoIP) or streaming media require low-latency. That is, such applications are sensitive to delays in transmission of individual packets and the overall QoS may be adversely affected by delays. Transmission of low-latency traffic, such as VoIP over a multiple-access media, such as Ethernet, involve prioritization of the traffic by the sending node prior to injection onto the multiple-access media. The concept is to place the VoIP traffic ahead of other traffic within the sending node. These techniques typically do not guarantee that high priority, low-latency traffic will successfully access the transmission channel.

In another example, Echelon has developed a predictive P-persistent carrier sense multiple access (CSMA) that achieves low-latency via an access priority scheme. Other examples have been proposed in the literature.

In a wireless network application, a separate radio frequency (RF) channel is often used to send VoIP data as a completely separate data link path. This approach essentially eliminates contention for the RF channel.

A common alternative method is to provide sufficient capacity overhead such that low-latency traffic can flow sufficiently quickly within the confines of the existing media access control (MAC) protocol. While such applications achieve the desired low-latency and QoS, the overall system architecture results in low efficiency with respect to overall channel utilization.

Therefore, it can be appreciated that there is a significant need for a system and method for delivery of low-latency data over a contention-based data link. The present invention provides this, and other advantages, as will be apparent from the following detailed description and accompanying figures.

BRIEF DESCRIPTION OF THE DRAWING(S)

DETAILED DESCRIPTION OF THE INVENTION

As will be discussed in greater detail herein, techniques disclosed herein can be used to provide transmission capabilities for low-latency applications, which are sometimes referred to as real time protocol (RTP) datagrams. The term "isochronous datagram delivery," as used herein, refers to the transmission of data at substantially uniform time intervals. For the sake of convenience, the data may be described as datagrams or data packets. Those skilled in the art will appreciate that standards, such as the international standards organization open systems interconnection (ISO/OSI) model, define multiple communication layers wherein the data or datagrams may be part of data frames transmitted in a data link layer. The lower portion of the data link layer is generally referred to as the media access control (MAC). Specific implementation of the MAC, and the data link layer in general, can be readily accomplished by those skilled in the art applying the teachings contained herein.

The term "contention-based data link," as used herein, refers to a communication link in which multiple users contend for access. The Ethernet is one example of a contention-based network. Wireless communication systems provide another example of contention-based networks. As will be apparent to one skilled in the art, the techniques described herein are applicable to wireless or wired contention-based networks.

Figure 1:
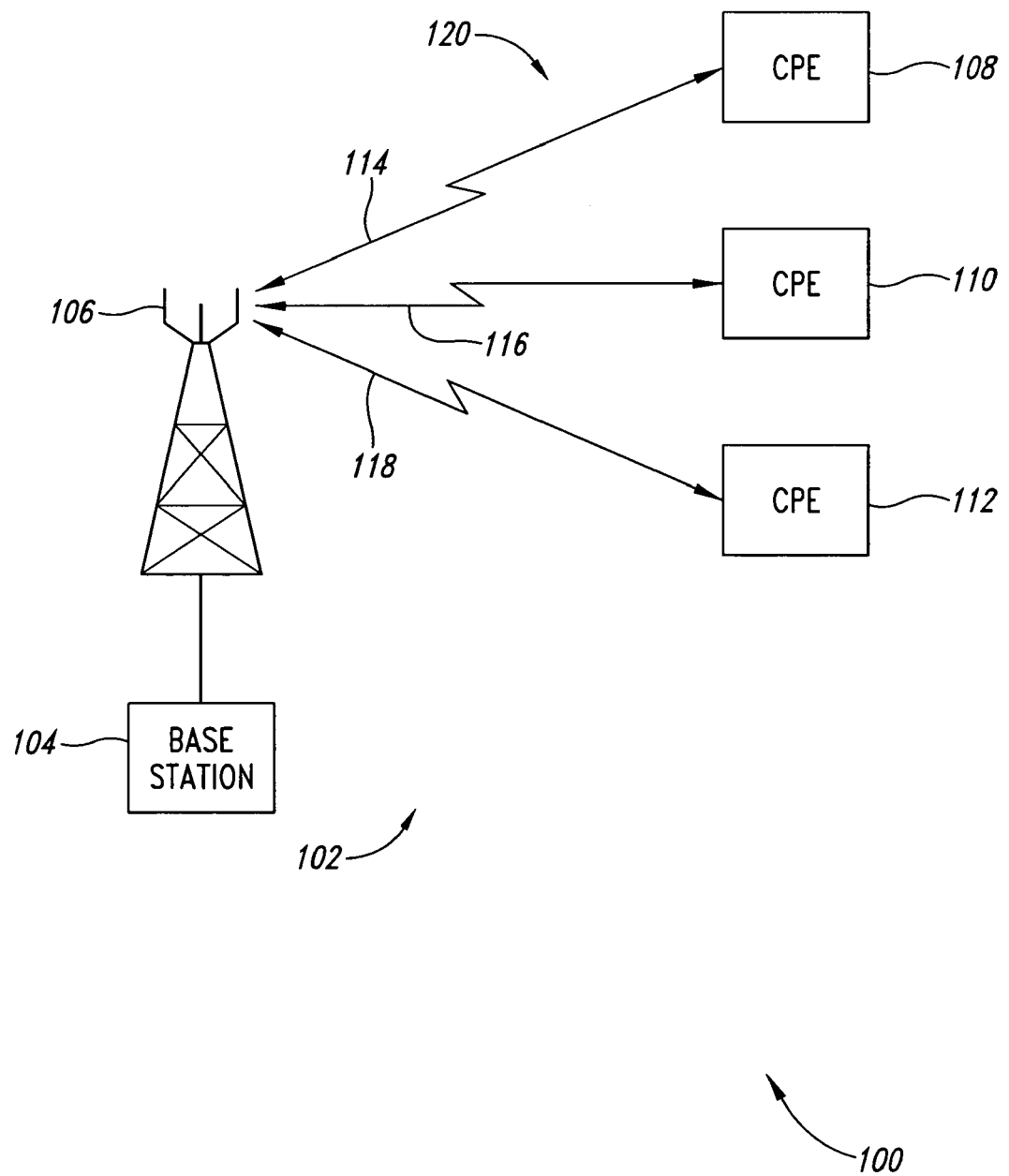
FIG. 1 is a functional block diagram of a wireless communication system.

The present invention is embodied in a system 100, which is illustrated in FIG. 1 implemented in a wireless communication network 102 constructed in accordance with the principles of the present invention. The wireless communication network 102 comprises a base station 104 coupled to an antenna system 106. The antenna system 106 is implemented in accordance with known principles and need not be discussed in greater detail herein. Although general operation of the base station 104 is well understood, certain additional features used to implement the system 100 will be described in greater detail below.

The wireless communication network 102 also includes a plurality of customer premise equipment (CPE) 108-112, which communicate with the base station via wireless communication links 114-118, respectively. The communication links 114-118 are illustrated in FIG. 1 as coupling the base station 104 to the individual CPEs 108-112, respectively. However, those skilled in the art will appreciate that the wireless communication links 114-118 may be considered a single contention-based communication link 120 when the CPEs 108-112 are communicating with the base station 104 on a single frequency channel.

In the simplified embodiment of the wireless communication network 102 illustrated in FIG. 1, contention for a communication link may be eliminated by providing a sufficient number of frequency channels by which the CPEs 108-112 may communicate with the base station 104. However, those skilled in the art will appreciate that a typical implementation may involve a single base station and 100 or more CPEs. The number of CPEs communicating with a given base station typically exceeds the number of frequency channels available for communication with the base station 104. Thus, the simplified diagram in FIG. 1 is intended to illustrate CPEs 108-112 communicating with the base station 104 over a single channel, which is illustrated in FIG. 1 as the contention-based link 120.

Figure 2:
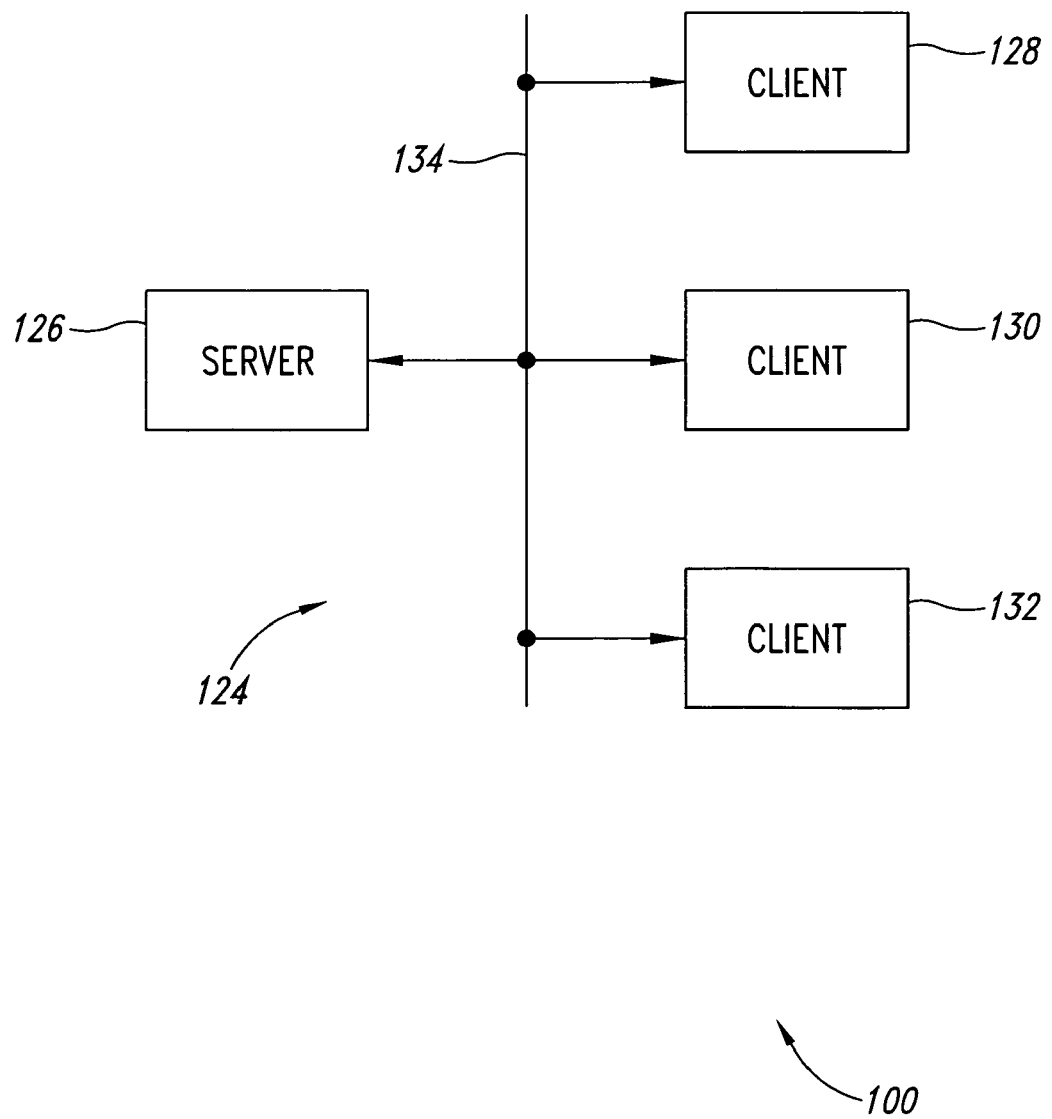
FIG. 2 is a functional block diagram of a wired communication system.

FIG. 2 illustrates a different exemplary embodiment of the system 100 implemented as a wired network 124. In this implementation, which is depicted in a client-server architecture, a plurality of client machines 128-132 communicate with each other and with a server 126 via a contention-based link 134. As discussed above, the Ethernet is one example of such a wired contention-based network.

In low-latency applications, such as VoIP, multi-media, streaming media, and the like, one computing device is sending data to another computing device. In the example illustration of FIG. 1, the base station 104 may be transmitting low-latency data to one or more of the CPEs, or may be receiving low-latency data from a CPE. Similarly, in the wired network implementation of FIG. 2, a client computer (e.g., the client computer 128) may be sending low-latency data to the server 126 or to another client computer. Conversely, the server 126 may be transmitting low-latency data to a client computing device. As used herein, the computing device transmitting the low-latency data is designated as the "sending station" or unit while the computing device receiving the low-latency data is designated as the "receiving station" or unit.

Figure 3:
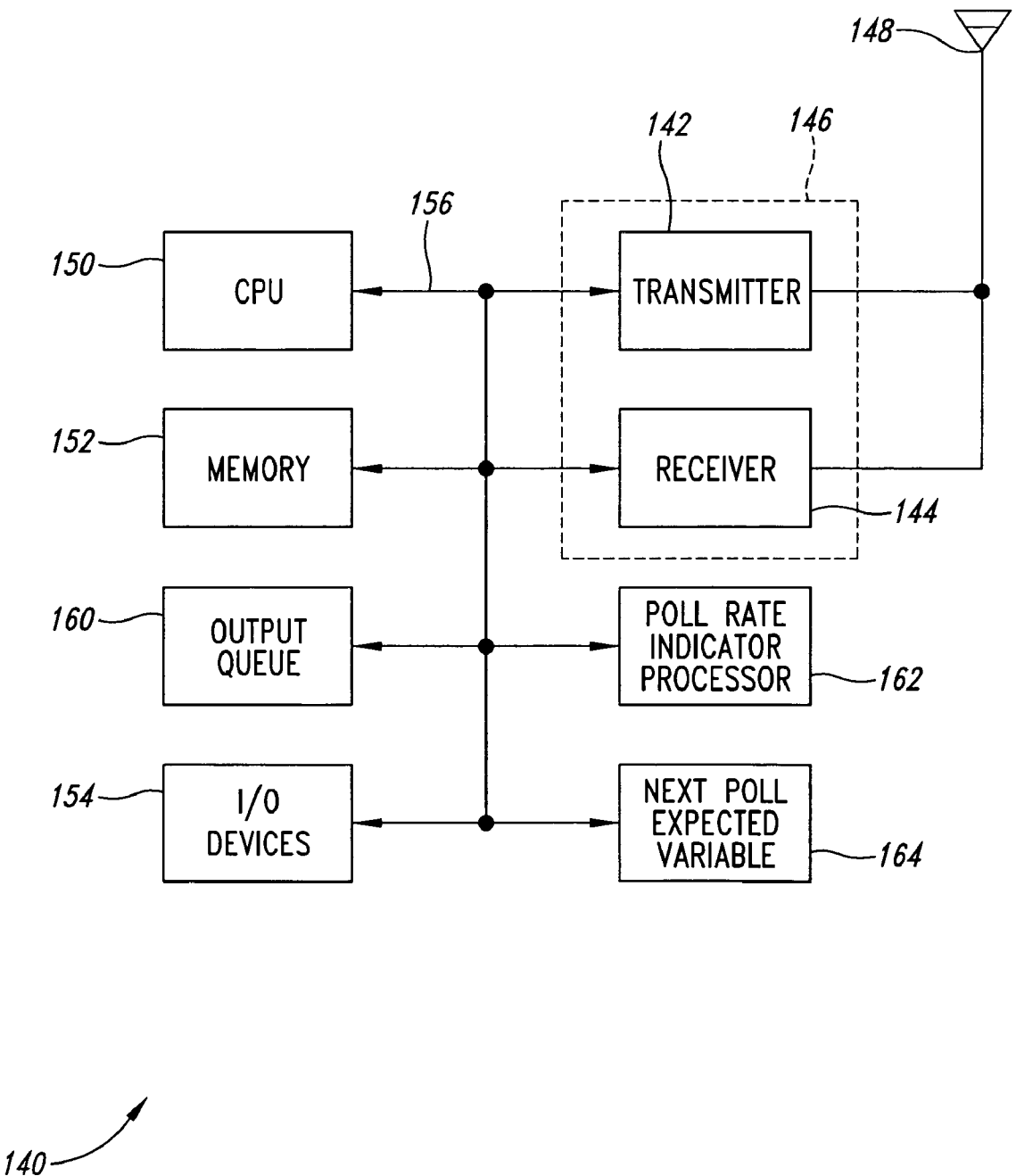
FIG. 3 is a functional block diagram of a wireless sending station of the system of FIG. 1.

FIG. 3 is a functional block diagram of a wireless sending station 140. As noted above, the sending station 140 may be the base station 104 or any CPE 108-112 of FIG. 1. The sending station 140 comprises a transmitter 142 and a receiver 144. Those skilled in the art will recognize that portions of the transmitter 142 and receiver 144 may be combined to form a transceiver 146. A specific implementation of the transmitter 142 and receiver 144 depends on the particular communication protocol. For example, the transmitter 142 and receiver 144 may be configured for operation utilizing orthogonal frequency division multiplexing (OFDM). Operation of these components is known in the art and need not be described in greater detail herein.

The transmitter 142 and receiver 144 are coupled to an antenna 148. The antenna on the sending station (e.g., the CPE 108 of FIG. 1) may be externally mounted on the consumer premises. Alternatively, the CPE 108 may be implemented in a configuration wherein the antenna 148 is an internal antenna. Such an implementation may advantageously permit nonline-of-sight (NLOS) operation.

An example of wireless operation using an OFDM NLOS CPE with internal premises antenna is provided in U.S. application Ser. No. 09/694,766, filed Oct. 23, 2000, and entitled FIXED OFDM WIRELESS MAN UTILIZING CPE HAVING INTERNAL ANTENNA. That application, which is assigned to the assignee of the present invention, is incorporated herein by reference in its entirety.

In a typical embodiment, the sending station 140 also includes a central processing unit (CPU) 150 and memory 152. The CPU 150 may be satisfactorily implemented by a conventional microprocessor, microcontroller, digital signal processor, programmable gate array, or the like. The present invention is not limited by the specific implementation of the CPU 150. Similarly, the memory 152 may include one or more conventional data storage components, such as random access memory, read-only memory, flash memory, or the like, and may include a combination of these elements. In general, the CPU 150 executes instructions stored in the memory 152.

The sending station 140 may also include a number of different I/O devices 154, such as a keyboard, display, cursor control device, mass storage device(s) and the like. For the sake of brevity, these various components, whose operation is well understood, are referred to as the I/O devices 154. The various components of the sending station 140 are coupled together by a bus system 156. The bus system 156 may comprise an address bus, data bas, control bus, power bus, and the like. For the sake of convenience, the various busses are illustrated in FIG. 3 as the bus system 156.

In operation, the sending station 140 has a data file to be transmitted to a receiving station. As is known in the art, the data file is generally packetized for transmission over the contention-based data link. The packetized data, sometimes referred to as a datagram, includes a data portion and a header portion. As those skilled in the art will understand, the header portion may include source address, destination address, error correction data, priority data, and the like. The specific implementation of packets used in the present invention can be readily determined by those skilled in the art utilizing the present teachings.

Using VoIP application as an example, voice input from a user may be supplied to the sending station 140 via a microphone or pre-stored in a mass storage device, which is one of the I/O devices 154. The voice data is temporarily stored in the memory 152 and processed by the CPU 150 into datagrams, as described above. The datagrams are then placed in an output queue 160 to await transmission to the receiving station.

The sending station 140 also includes a poll rate indicator processor 162. Although illustrated as a separate block in the functional block diagram of FIG. 3, the poll rate indicator processor 162 may actually be implemented utilizing computer instructions in the memory 152 executed by the CPU 150. However, FIG. 3 illustrates the poll rate indicator processor 162 as a separate block because it performs a distinct function.

As will be described in greater detail below, the poll rate indicator processor 162 determines a polling rate data value to indicate the rate at which the receiving station should poll the sending station 140 for data. The polling rate data value is sent to the receiving station to thereby permit the receiving station to adjust the polling rate (i.e., the rate at which the receiving station polls the sending station for a datagram). In an exemplary embodiment, the poll rate indicator processor 162 monitors the number of datagrams in the output queue 160. Ideally, the output queue 160 will contain only a single datagram if the polling rate is properly adjusted. If the output queue 160 contains more than one datagram, the poll rate indicator processor 162 may alter the polling rate data transmitted to the receiving station to indicate that the receiving station should increase its polling rate. Conversely, if no datagrams are present in the output queue 160, the poll rate indicator processor 162 may adjust the polling rate data value sent to the receiving station to allow the receiving station to decrease its polling rate. The operation of the polling rate indicator processor 162 is described in greater detail below.

The sending station 140 also has a next poll expected (NPE) variable 164 to indicate when the next poll is expected from the receiving station. The NPE interval variable 164 is used internally within the sending station 140 as part of the sending algorithm. The poll rate indicator processor 162 adjusts this variable based on the number of datagrams in the output queue 160.

Figure 4:
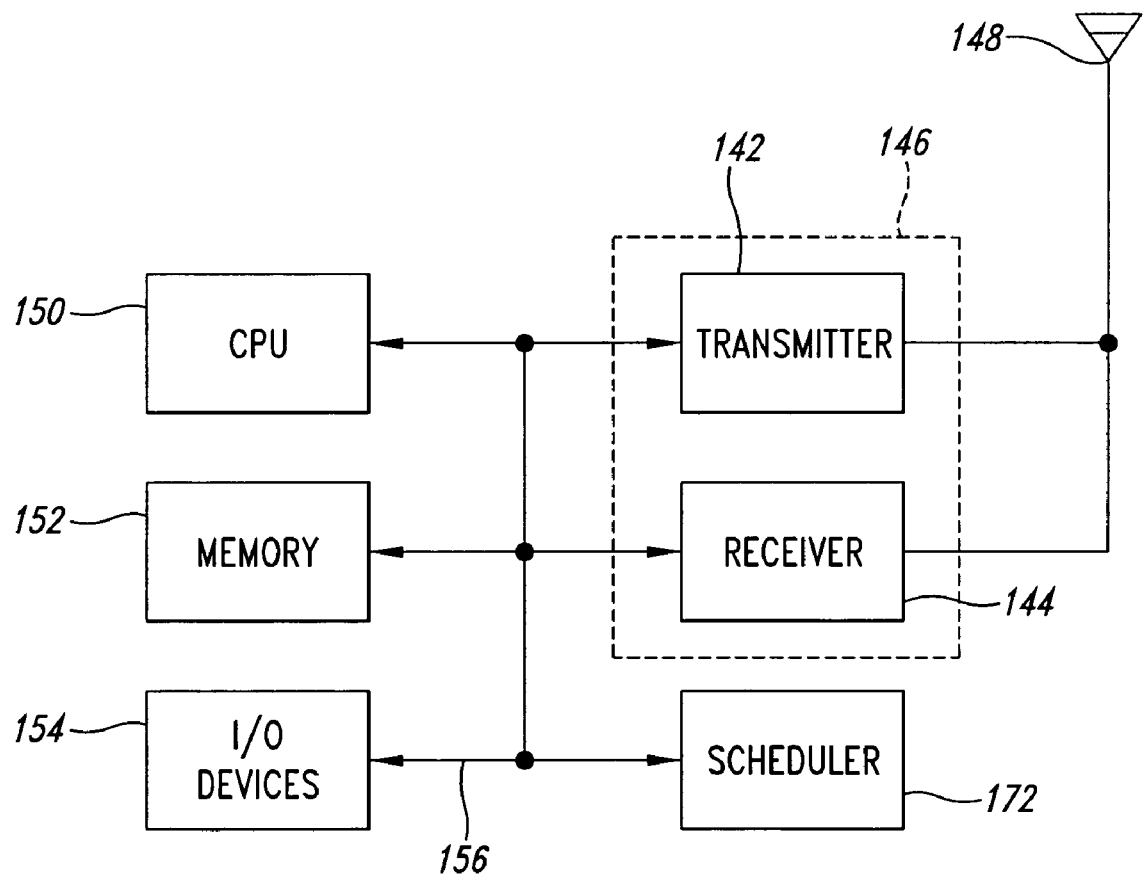
FIG. 4 is a functional block diagram of a wireless receiving station of the system of FIG. 1.

FIG. 4 is a functional block diagram of a wireless receiving station 170. Many of the components of the receiving station 170 are identical in operation to the corresponding components in the sending station 140 and are identically numbered. That is, the receiving station 170 also has a transmitter 142, receiver 144, which may be combined into a transceiver 146. The transmitter 142 and receiver 144 are coupled to the antenna 148. The receiving station 170 also includes the CPU 150, memory 152, and I/O devices 154. The various components of the receiving station 170 are coupled together by the bus system 156.

In addition to the components described above, the receiving station 170 includes a scheduler 172. The scheduler 172 receives the polling rate data generated by the polling rate indicator processor 162 (see FIG. 3) and determines an appropriate polling rate based on that received data. Although the sending station 140 sends data indicative of the appropriate polling rate, it is the receiving station 170 that actually controls the rate of reception of datagrams from the sending station. That is, the scheduler 172 utilizes data received from the sending station 140 and generates a polling rate. In response to the polling rate, the transmitter 142 in the receiving station 170 sends a poll request to the sending station 140 to transmit a datagram awaiting transmission in the output queue 160.

The operation of the system 100 may now be described in greater detail. The process will be described using the wireless system of FIG. 1. However, the process is equally applicable to the wired system of FIG. 2. The polling techniques described herein are a reservation based, demand-adaptive, controlled access protocol that operates simultaneously within a contention-based multiple access control protocol while using a minimum of computational resources. In an exemplary embodiment, the system 100 operates simultaneously within an explicit reservation system, such as the reservation-Aloha protocol. The reservation protocol is modified to include a preempt signal that transparently interrupts a previously reserved sending station to allow a higher priority sending station to transmit an isochronous datagram. Following transmission of the isochronous datagram, the preemption process terminates and the interrupted sending station resumes transmission of its data.

The desired low latency is accomplished by the use of an explicit reservation on the data channel by the receiving station 170 (see FIG. 4), which permits the sending station 140 (see FIG. 3) to avoid the latency involved with channel acquisition. The explicit reservation process by the receiving station 170 is implemented using a poll by the receiving station to transparently interrupt an established communication link. Efficiency is achieved by dynamically adapting the polling rate to match the sending data rate to thereby eliminate wasted channel capacity. The dynamic adaptation, which will be described in greater detail below, is accomplished by simply observing the depth in the output queue 160 (see FIG. 3) of the sending station 140. As those skilled in the art will appreciate, this simple monitoring process requires minimal computational resources.

The data link protocol comprises two data elements in addition to conventional datagram information. This includes a "preempt" signal sent from the receiving station 170 to the sending station 140. In addition, the data link protocol comprises a "next poll interval" returned by the sending station 140 to the receiving station 170 along with the isochronous datagram.

Figure 5:
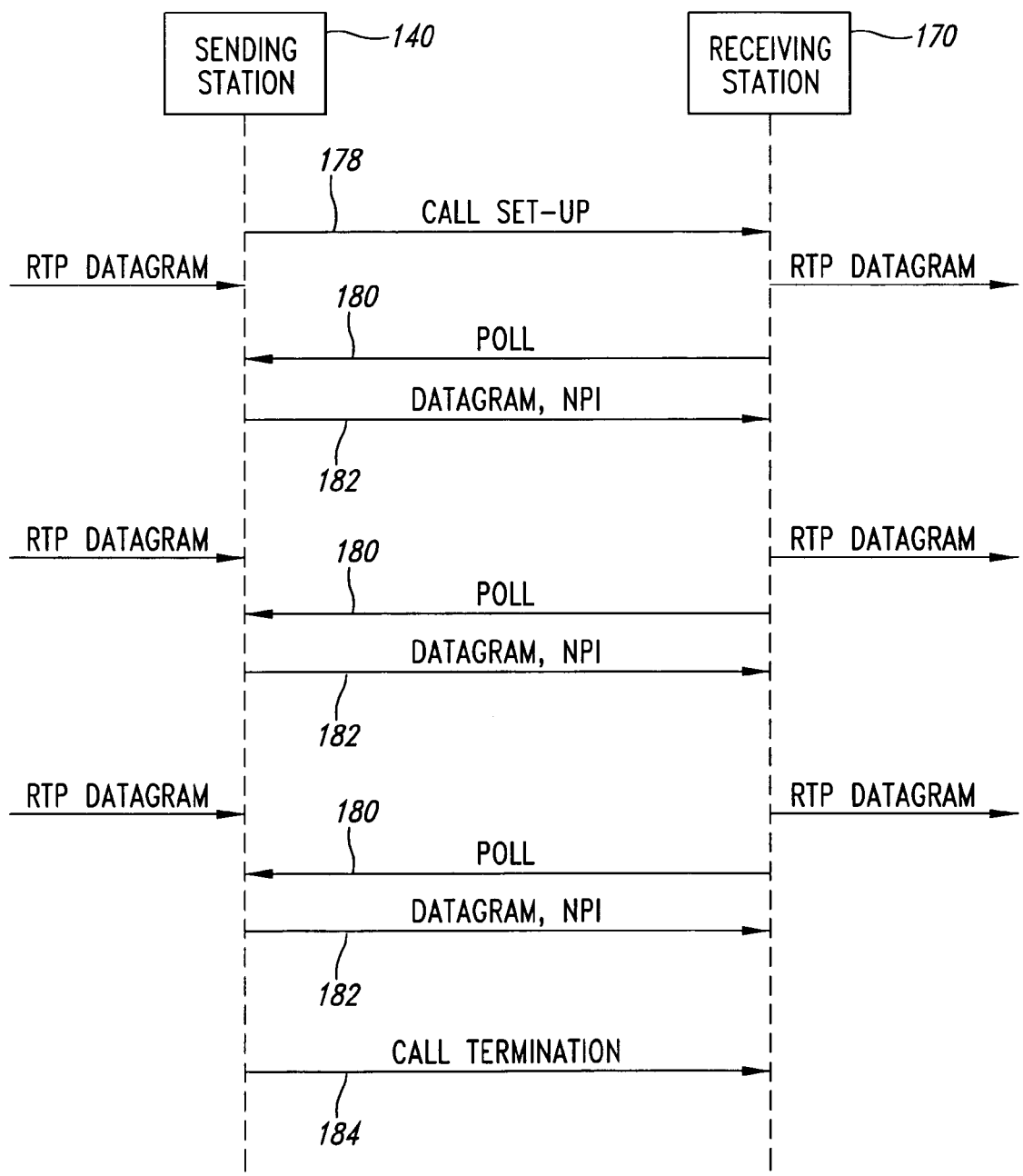
FIG. 5 is an exemplary illustration of an isochronous session protocol.

FIG. 5 illustrates an exemplary embodiment of an isochronous session protocol 176. A call set up request 178 from the sending station 140 to the receiving station 170 indicates the need to transmit a real time protocol (RTP) datagram. In response to the call set up 178, the receiving station 170 transmits a poll 180. The sending station 140 responds to the poll by transmitting a datagram 182 to the receiving station 170. The sending station 140 also transmits a next poll interval (NPI) data value as part of the datagram transmission to indicate when the receiving station should transmit its next poll. The process of transmitting a poll 180 from the receiving station 170 to the sending station 140 and transmission of the datagram and NPI data value 182 continues until the complete data file has been transmitted to the receiving station.

When the last of the RTP datagrams has been transmitted from the sending station 140 to the receiving station 170, the sending station transmits a call termination 184. This indicates to the receiving station that the preemption has ended and that additional polls to the sending station 140 are unnecessary. Those skilled in the art will appreciate that both the sending station 140 and the receiving station 170 may also include time-out protocols. For example, if the sending station 140 does not receive a poll 180 for some predetermined period of time, the sending station may terminate the process and/or attempt a new call setup 178 to the receiving station 170. Similarly, the receiving station 170 may include a time-out protocol where it terminates the polling process if it does not receive a response to a poll 180 within some predetermined period of time.

The isochronous session protocol of FIG. 5 provides an exemplary embodiment of the system 100. However, those skilled in the art will recognize that a variety of alternative implementations may be satisfactorily used with the system 100. For example, FIG. 5 illustrates a 1:1 correspondence between the poll 180 and the datagram, NPI 182. However, the sending station 140 may send multiple datagrams in response to a single poll if the allocated time slot is sufficiently long. Alternatively, the sending station 140 may send a fragment of a datagram if the allocated timeslot is short. Thus, the example of FIG. 5 is not intended to require a 1:1 correspondence between polls and datagrams.

Similarly, the example protocol illustrated in FIG. 5 shows a transmission of an NPI data value transmitted with each datagram. However, those skilled in the art will appreciate that variations are possible here as well. For example, it may only be necessary to transmit an NPI data value when the sending station 140 wishes to adjust a previously transmitted data value. For example, if the previous NPI data value was 5 and the sending station 140 does not need to adjust this value, no NPI data value need be transmitted along with the datagram. In this exemplary embodiment, the receiving station would interpret the lack of an NPI data value as an instruction to keep the polling rate at its previous value.

The sending station 140 initiates the isochronous session by sending the call set up request 178 to the receiving station 170. The receiving station 170 then sends a poll signal to poll the sending station 140 for isochronous data. Although the poll signal is explicitly addressed to the isochronous sending station (i.e., the sending station 140 of FIG. 3), it is also interpreted by the sending station that had a previous channel reservation. The previous sending station, when observing the poll signal to another sending station interprets the poll as a "preempt" signal with respect to its own activities. In response to this preempt signal, the previous sending station will simply suspend transmission of its own data until the preempt signal is removed. When the isochronous sending station 140 receives the poll, it responds by transmitting the RTP datagram 182 along with its current NPI data value. Thus, the poll signal is interpreted by the sending station 140 as an instruction to transmit an RTP datagram while the same data field is interpreted by the previous sending station as a preempt signal.

When the receiving station 170 processes the incoming RTP datagram, the NPI data value is used to determine when the next poll must be generated. For example, the sending station may have need for a high throughput rate and requires the same time slot in each data frame. In that case, the preemption of the previous sending station would continue indefinitely. In another example, the application may require the sending station to send datagrams by way of example, every 4 frames. During the intervening 3 frames, the receiving station 170 effectively removes the preempt signal and allows the previously reserved station to resume transmission of its data or a third sending station to transmit data. The use of the preempt signal permits the interposition of isochronous polls transparently within a reservation-Aloha protocol.

Figure 6:
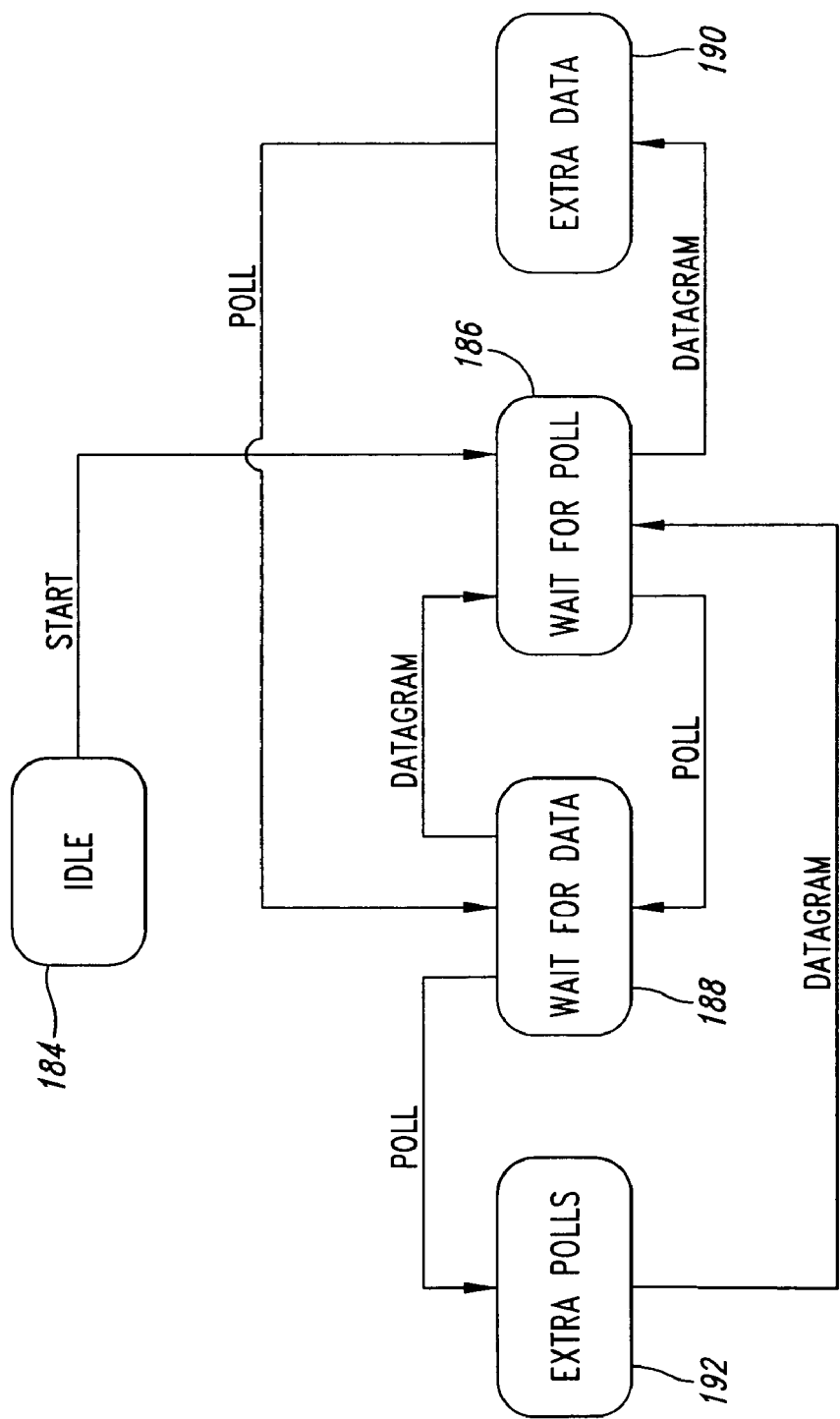
FIG. 6 is an exemplary illustration of an isochronous session protocol states for a sending station.
Figure 7:
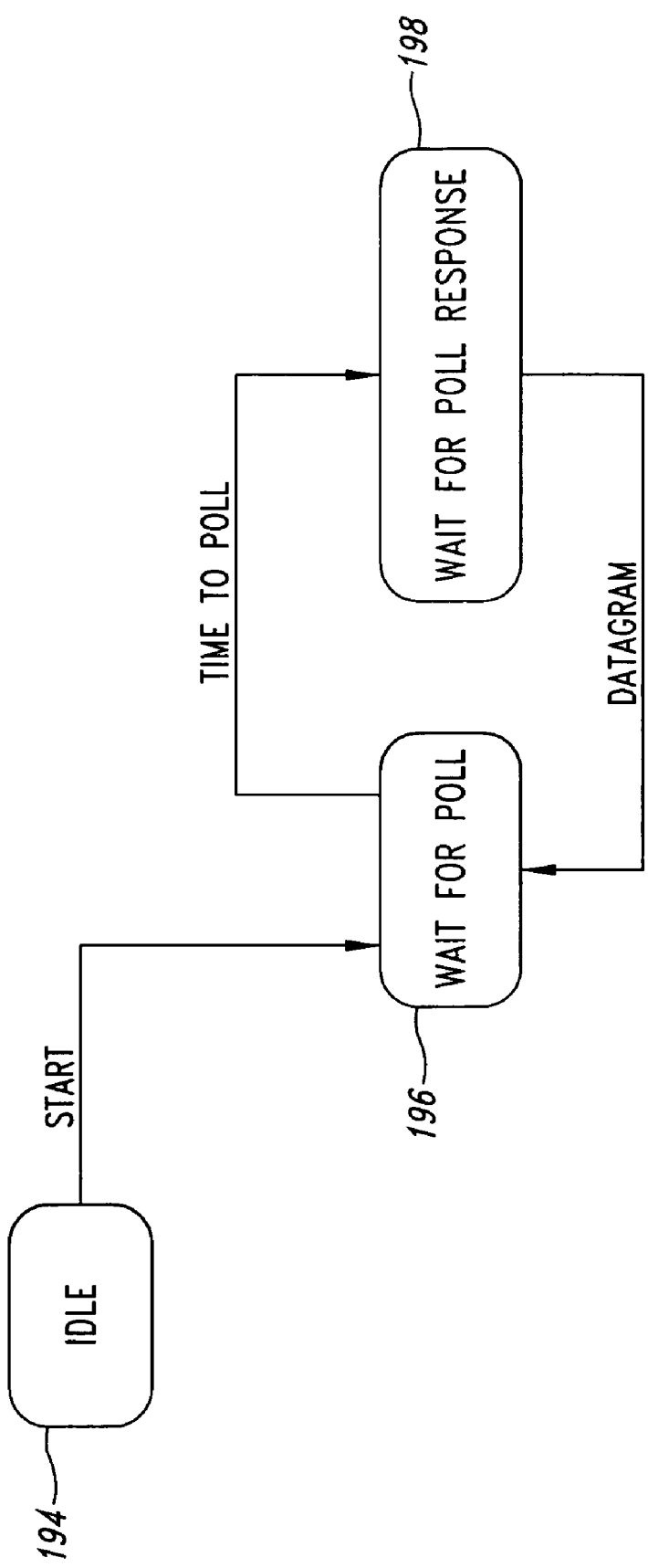
FIG. 7 is an exemplary illustration of an isochronous session protocol states for a receiving station.

FIGS. 6 and 7 are simplified state diagrams for the sending station (the sending station 140 of FIG. 3) and the receiving station (e.g., the receiving station 170 of FIG. 4). It should be noted that these are simplified diagrams that do not illustrate all transitions. With respect to FIG. 6, the sending station 140 is in the Idle state 184 until a call setup 178 (see FIG. 5) has been sent to initiate an isochronous data transfer session. At the start of an isochronous data session, the sending station 140 enters a WaitForPoll state 186. In response to a poll from the receiving station 170, the sending station 140 enters a WaitForData state 188. Transmission of a datagram from the sending station 140 to the receiving station 170 causes a change in state from the WaitForData state 188 to the WaitForPoll state 186. Ideally, the poll rate matches the data transfer rate. In this case, the sending station 140 simply flips back and forth between the WaitForPoll state 186 and the WaitForData state 188.

If the polling rate is too slow, the datagrams will begin to build up within the sending station. In response to the receipt of an additional datagram, sending station 140 changes states from the WaitForPoll state 186 to an ExtraData state 190. This indicates that the receiving station 170 is polling too slowly. In response to a poll from the receiving station 170, the sending station 140 transitions from the ExtraData state 190 to the WaitForData state 188. As will be described in greater detail below, the sending station 170 also sends data to the receiving station 170 indicating that the polling rate should increase. This forces the receiving station back to flipping between the WaitForPoll state 186 and the WaitForData state 188.

In the event that the receiving station 170 is polling too frequently, a poll may arrive before a datagram is available for transmission. If the sending station 140 is in the WaitForData state 188 (as the result of a previously received poll) and an additional poll is received, the sending station 140 transitions to an ExtraPolls state 192. This indicates that the polling rate is too fast. The availability of a datagram causes a state transition from the ExtraPolls state 192 to the WaitForPoll state 186. In addition, the datagram may include instructions to the receiving station 170 to decrease the polling rate. Thus, the state diagram illustrated in FIG. 6 tends to force the sending station to operate between the WaitForPoll state 186 and the WaitForData state 188. As conditions change, the sending station 140 sends instructions to the receiving state to adjust the polling rate (either increase or decrease the polling rate) to avoid operation in the ExtraData state 190 or the ExtraPolls state 192.

With respect to FIG. 7, the receiving station 170 is initially in an Idle state 194 until the call setup 178 (see FIG. 5) is received. The call setup 178 forces the receiving station 170 into a WaitForPoll state 196. In the WaitForPoll state 196, the receiving station 170 is waiting for the selected frame and the selected timeslot within the selected frame. At the appropriate time, the receiving station transmits a poll to the target sending station 140 (thus preempting any previous sender) and transitions to a WaitForPollResponse state 198. When a datagram is received from the sending station 140, the receiving station 170 flips back from the WaitForPoll response state 198 to the WaitForPoll state 196. This process continues until the call termination 184 is received from the sending station 140. The receiving station 170 has a call teardown state, which is not illustrated in FIG. 7.

Figure 8:
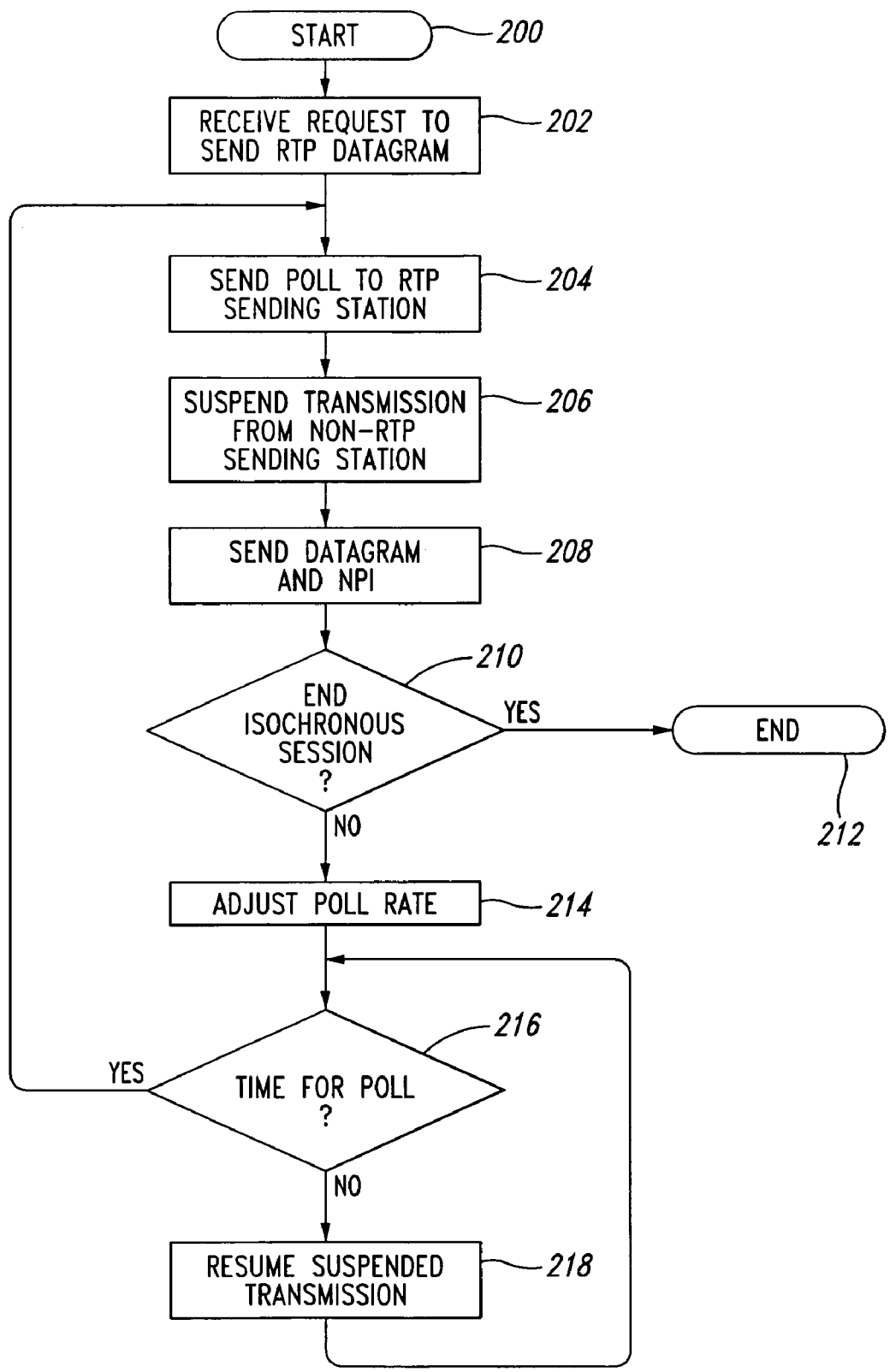
FIG. 8 is a flow chart illustrating the operation of the system of FIG. 1.

The overall operation of an exemplary embodiment of the system 100 is illustrated in the flow chart of FIG. 8 where at a start 200 a receiving station (e.g., the receiving station 170 of FIG. 4) is receiving data from one or more sending stations over a contention-based datalink. At step 202, the receiving station 170 receives a request from a sending station (e.g., the sending station 140 of FIG. 3) to set up an isochronous session that will allow the sending station 140 to send one or more RTP datagrams. At step 204, the receiving station 170 transmits a poll to the RTP datagram sending station 140. As noted above, other sending stations interpret this poll as preempt request and, in step 206, a non-RTP sending station suspends transmission of data during the preemption. As further noted above, this preemption occurs transparent to the reservation-Aloha system.

In step 208, the sending station 140 sends RTP datagram that includes both data and an NPI data value in response to the poll in step 206. In decision 210, the system 100 that determines whether the RTP transmission indicates a request to terminate the isochronous session. If the sending station 140 has requested an end to the isochronous session, the result of decision 210 is YES. In that event, the system 100 terminates the isochronous session and ends the process at 212. If the interrupted (i.e., non-RTP) sending station still has data awaiting transmission, the suspended transmission is transparently resumed without requiring any additional call setup processing for resumption of the suspended transmission.

If the isochronous session is not ending, the result of decision 210 is NO. In that event, the receiving station 170 adjusts the polling rate in step 214 and, in decision 216, determines whether it is the correct time for the next poll to the RTP sending station 140. As previously discussed, the sending station 140 transmits the NPI data value to the receiving station 170 to indicate how frequently polls should occur. While the RTP datagram transfer rate may be sufficiently high such that data is transmitted from the sending station 140 every data frame, a more typical implementation may require transmission of one or more RTP datagrams every few data frames. In the intervening data frames, other stations are free to utilize that time slot for transmission of their own data. This includes the suspended transmission from the non-RTP sending station.

If it is the time for a poll to the RTP datagram sending station 140, the result of decision 216 is YES. In that event, the system returns to step 204 where the receiving station 170 transmits a poll to the RTP sending station 140.

If it is not the time for the next poll to the RTP sending station 140, the result of decision 216 is NO. In that event, the non-RTP sending station may resume the suspended transmission in step 218. As noted above, other stations may also utilize the reserved time slot in intervening data frames if the suspended transmission has ended. That is, any sending station may utilize the time slot until it is time for the receiving station 170 to transmit a poll to the RTP sending station 140. Thus, the reserved slots for a lower priority sending stations are preempted for use by a higher priority sending station transmitting a RTP datagrams. During the operation of the isochronous session, the polling rate is dynamically adjusted such that the transmission rate substantially equals the receive rate. Upon completion of the RTP datagram transmission, the suspended lower priority transmission may resume if there are one or more data frames available before the next poll to the sending station 140. This process permits transparent operation of the RTP datagram transmission and minimizes channel access time by preempting the already reserved slot. In addition, the computationally efficient polling rate adjustment algorhithm allows for efficient transmission of the datagram.

Figure 9:
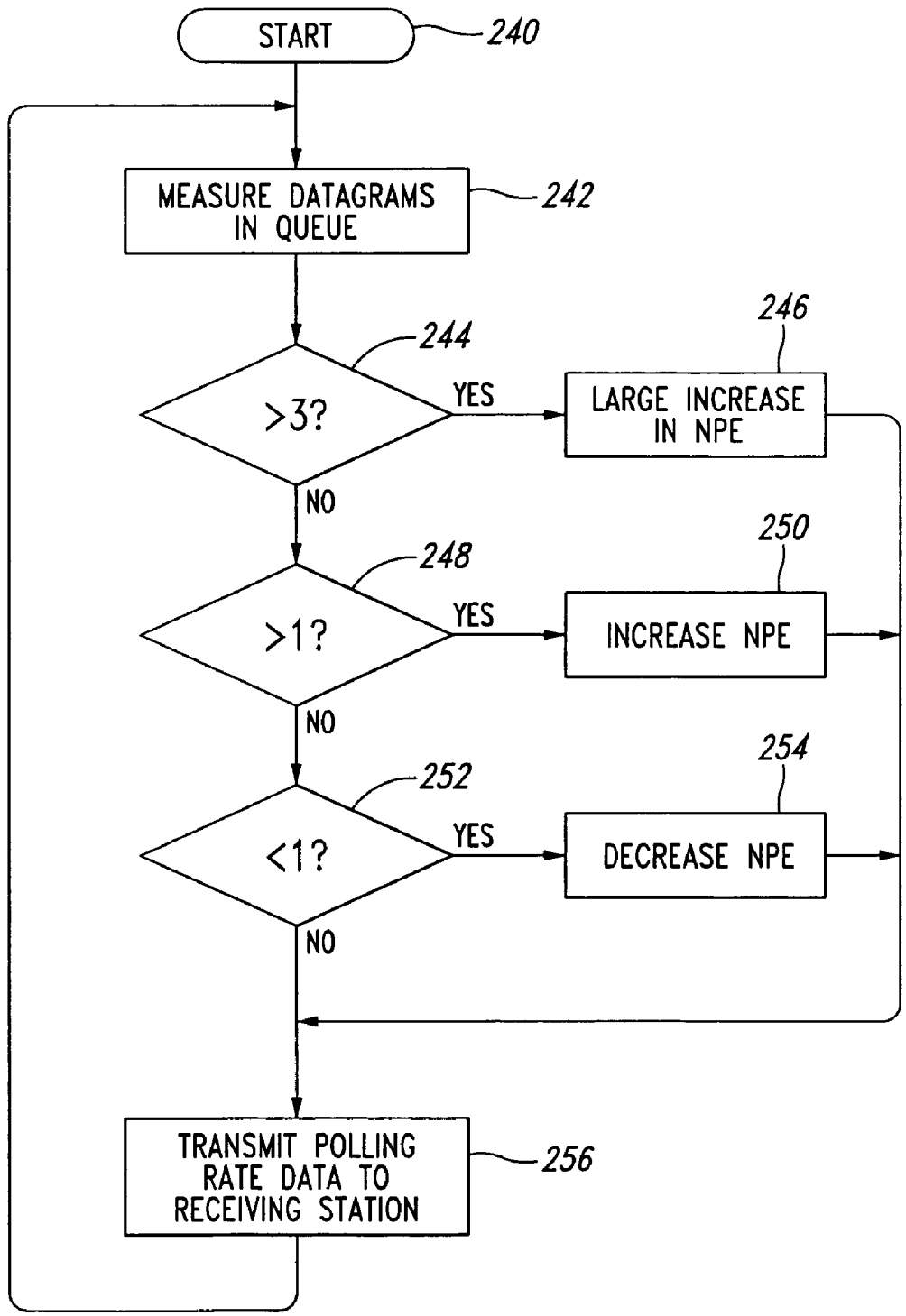
FIG. 9 is a flow chart illustrating the operation of the system for adjusting transmission rate.

The operation of the system 100 to dynamically adjust the polling rate is illustrated in a flow chart of FIG. 9 where a start 240 the appropriate call set-up processes have been completed and in step 242, the poll rate indicator processor 162 (see FIG. 3) measures the number of datagrams in the output queue 160. In decision 244, the poll rate indicator processor 162 determines if the number of datagrams in the output queue 160 exceeds three. If the number of datagrams in the output queue 160 is greater than three, the result of decision 244 is YES and, in step 246, the poll rate indicator processor 162 generates data requesting a significant increase in the NPE variable 164.

If there are less than three datagrams in the output queue 160 (see FIG. 3), the result of decision 244 is NO. In that event, the process moves to decision 248 to determine whether the number of datagrams in the output queue 160 is greater than one. If more than one datagram is in the output queue 160, the result of decision 248 is YES and, in step 250, the poll rate indicator processor 162 generates data to increase the NPE variable 164.

If the output queue 160 (see FIG. 3) does not contain more than one datagram, the result of decision 248 is NO. In that event, in decision 252, the system 100 determines whether there is less than one datagram in the output queue 160. If there is less than one datagram in the output queue 160, the result of decision 252 is YES and in step 254, the poll rate indicator processor 162 decreases the NPE variable 164.

If the output queue 160 does not have less than one datagram, the result of decision 252 is NO. In that event, or following the change in the NPE variable 164 in step 246, 250, or 254, the sending station 140 transmits the polling rate data value NPI to the receiving station (e.g., the receiving station 170 of FIG. 4) in step 256. Following the transmission of the polling rate data value in step 256, the system 100 returns to step 242 to measure the number of datagrams in the output queue 160.

The sending station 140 transmits the NPI data value to the receiving station 170 as part of the RTP datagram. In one embodiment, the NPI data value may be set equal to the NPE variable 164. Alternatively, the sending station 140 may send a data value other than the NPE variable 164. For example, the NPE variable 164 may increase as a result of a backup of RTP datagrams in the output queue 160. However, rather than force a rapid change in the polling rate by the receiving station 170, the sending station 140 may send a different data value, other than the NPE variable 164, so as to adjust the polling rate in the receiving station 170 more gradually than might otherwise be indicated by the NPE variable. The NPI value sent from the sending station 140 to the receiving station 170 may be greater than or less than the NPE variable 164 depending upon implementation details.

The next poll interval variable adjustment process described above is one exemplary embodiment. Where the NPE variable 164 is adjusted to try and keep the number of datagrams in the queue 160 at a level of one datagram. Those skilled in the art will appreciate that different thresholds may be utilized in implementing the sending station 140. That is, an implementation may desire to have two datagrams in the output queue 160 to optimize data processing by the sending station 140. Similarly, a threshold of more than three RTP datagrams may be required in the queue 160 prior to a large increase in the next poll expected variable 164. The present invention is clearly not limited by the specific number of RTP datagrams in the output queue 160 for the various thresholds described above.

As previously noted, the polling interval data transmitted from the sending station 140 to the receiving station 170 indicates the delay time until the next polling request by the receiving station. This value can be provided in a variety of different units based on the particular implementation. For example, the polling interval data may be time dependent units, such as slot times, symbol times, frame times or the like. Alternatively, the polling interval may simply be in time units, such as fractional seconds. In an exemplary embodiment, the NPI value transmitted from the sending station 140 to the receiving station 170 indicates a number of delay frames until the next poll. For example, if the NPI is 5, then the scheduler 174 (see FIG. 4) schedules the next poll to occur after 5 frames of delay. That is, the scheduler 174 will poll the sending station 140 again after 5 frames.

The process has been described above for a wireless communication system implementation. However, those skilled in the art will appreciate that a wire line implementation may also be advantageously implemented in accordance with the present teachings. That is, a wire line, such as an Ethernet, also operates over a contention-based datalink. In this implementation, illustrated in FIG. 2, the sending station may be either the client 128-132 or the server 126. Similarly, the receiving station may be implemented in any of the other clients or server. Components, such as the transmitter 142 and receiver 144 may be replaced with network components, such as a network interface card (NIC). Operation of an NIC is well known in the art and need not be described in greater detail herein.

Figure 10:
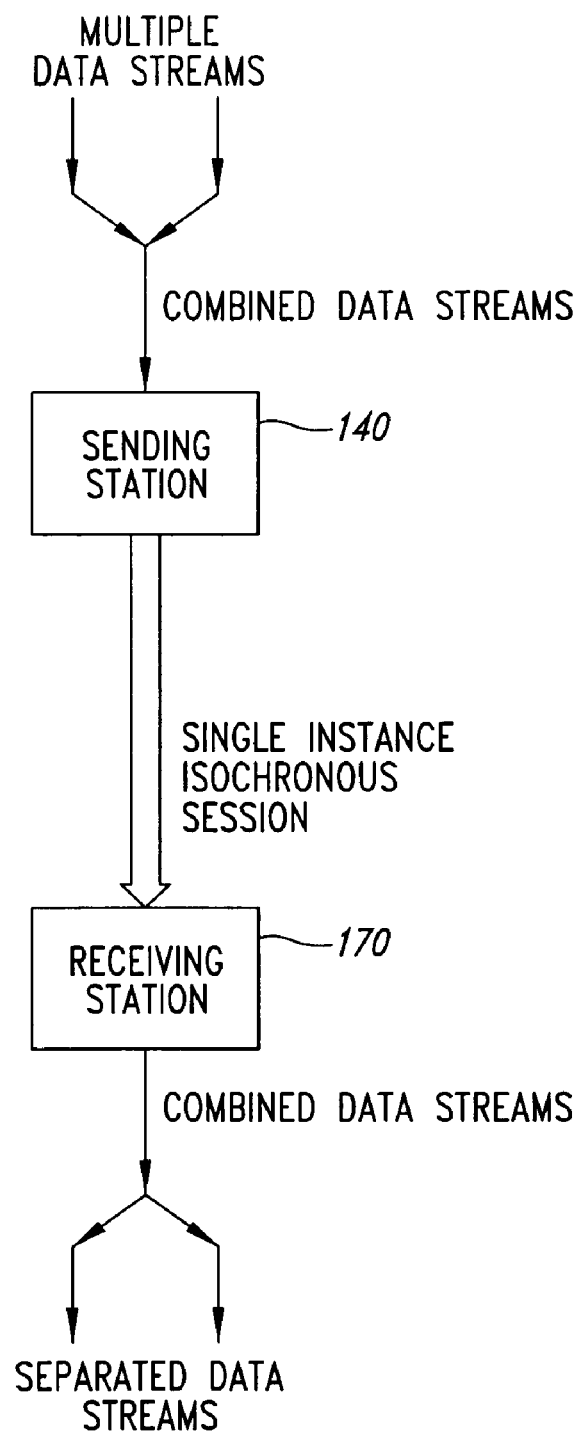
FIG. 10 illustrates the combination of multiple data streams in a single isochronous session.

In the embodiment described above, a single isochronous session was set up between the sending station (e.g., the sending station 140 of FIG. 3) and the receiving station (e.g., the receiving station 170 of FIG. 4). In this embodiment, it is necessary to multiplex signals prior to transmission over the link. This is illustrated in FIG. 10 where multiple data streams are multiplexed in the sending station 140 or by an application software process prior to data transfer to the sending station. The receiving station 170 transmits a poll to the sending station 140 for the single isochronous session. The multiplexed data is transferred over the link and demultiplexed by the receiving station 170 or by an application program to which the multiplexed data is delivered.

Figure 11:
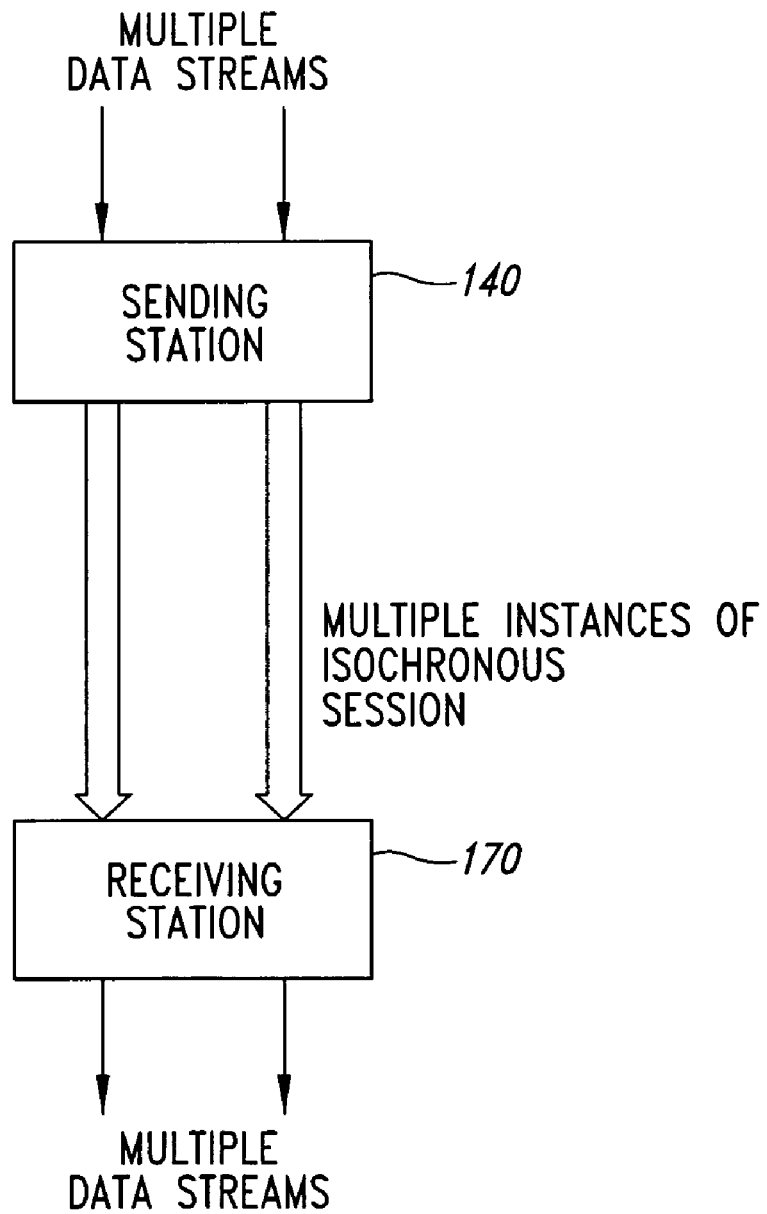
FIG. 11 illustrates the use of multiple isochronous sessions for multiple data streams.

In an alternative embodiment, illustrated in FIG. 11, it is possible to establish multiple isochronous data sessions between a single sending station (e.g., the sending station 140 of FIG. 3) and a single receiving station (e.g., the receiving station 170 of FIG. 4). The embodiment of FIG. 11 operates in essentially the manner described above for a single isochronous data session, but extends the protocol to include a "session identifier" so that the multiple isochronous sessions can be distinguished by the sending station 140 and the receiving station 170. For example, when the receiving station 170 sends a poll with the preempt to the sending station 140, it needs to specify not only the address of the sending station, but also identify the instance of the isochronous session. This can be readily accomplished via a session identifier data element added to the poll. FIG. 11 illustrates two simultaneous isochronous sessions. However, those skilled in the art will recognize that this principle may be expanded to additional simultaneous isochronous sessions.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A method for isochronous datagram delivery in a contention-based wireless communication system having a base station and a plurality of sending stations, comprising:

scheduling a transmission time for each of the plurality of sending stations wherein each of the plurality of sending stations is in contention with others of the sending stations for transmission times;

communicating a scheduled transmission time to a first of the plurality of sending stations, the scheduled transmission time being reserved for transmission of data by the first of the plurality of sending stations;

receiving a request from a second of the plurality of sending stations to transmit a substantially isochronous datagram, the request having a higher priority than the first of the plurality of sending stations;

interrupting the scheduled transmission time reserved for transmission of data by the first of the plurality of sending stations;

during the interruption, transmitting the substantially isochronous datagram from the second of the plurality of sending stations to the base station; and resuming transmission of the data by the interrupted first of the plurality of sending stations.

2. The method of claim 1, further comprising transmitting polling rate data from the second of the plurality of sending stations to the base station, the base station using the polling rate data to establish a polling rate at which the base station will poll the second of the plurality of sending stations to transmit the substantially isochronous data to the base station.

3. The method of claim 2, further comprising adjusting the polling rate data from the second of the plurality of sending stations to the base station based on a number of datagrams awaiting transmission from the second of the plurality of sending stations to the base station.

4. The method of claim 2 wherein the polling rate data is transmitted from the second of the plurality of sending stations to the base station as part of the substantially isochronous data.

5. The method of claim 2, further comprising dynamically adjusting the polling rate data transmitted from the second of the plurality of sending stations to the base station.

6. The method of claim 5 wherein the polling rate data indicates a number of delay frames until the base station will poll the second of the plurality of sending stations to transmit the substantially isochronous data to the base station.

7. The method of claim 1 wherein transmission of data by the second of the plurality of sending stations utilizes an orthogonal frequency division multiplexing (OFDM) communication system.

8. The method of claim 1 wherein the base station and the second of the plurality of sending stations are positioned so that direct line of sight between the base station and the second of the plurality of sending stations is not possible, and the second of the plurality of sending stations utilizes an orthogonal frequency division multiplexing (OFDM) non-line-of-sight (NLOS) communication system.

9. The method of claim 1 wherein scheduling a transmission time, communicating the scheduled transmission time, receiving a request from a second of the plurality of sending stations, interrupting the scheduled transmission time are controlled by a media access control (MAC) layer communication protocol.

10. A method for isochronous datagram delivery in a contention-based communication system having a receiving station and a plurality of sending stations, comprising:

scheduling a transmission time for each of the plurality of sending stations wherein each of the plurality of sending stations is in contention with others of the sending stations for transmission times;

communicating a scheduled transmission time to a first of the plurality of sending stations, the scheduled transmission time being reserved for transmission of data by the first of the plurality of sending stations;

receiving a request from a second of the plurality of sending stations to transmit a substantially isochronous datagram, the request from the second of the plurality of sending stations having a higher priority than the first of the plurality of sending stations;

interrupting the scheduled transmission time reserved for transmission of data by the first of the plurality of sending stations;

during the interruption, receiving the substantially isochronous datagram transmitted from the second of the plurality of sending stations to the base station; and resuming receiving the data transmitted by the interrupted first of the plurality of sending stations.

11. The method of claim 10, further comprising:

receiving polling rate data transmitted from the second of the plurality of sending stations to the receiving station; and using the polling rate data to establish a polling rate at which the receiving station will poll the second of the plurality of sending stations to transmit the substantially isochronous data to the receiving station.

12. The method of claim 11, further comprising:

receiving altered polling rate data transmitted from the second of the plurality of sending stations to the receiving station; and adjusting the polling rate in response to the altered polling rate data.

13. The method of claim 11 wherein the polling rate data is received from the second of the plurality of sending stations as part of the substantially isochronous data.

14. The method of claim 11, further comprising dynamically adjusting the polling rate in response to the polling rate data received from the second of the plurality of sending stations.

15. The method of claim 14 wherein the polling rate indicates a number of data frames until the receiving station will poll the second of the plurality of sending stations to transmit the substantially isochronous data to the receiving station.

16. The method of claim 10 wherein reception of data transmitted by the second of the plurality of sending stations utilizes an orthogonal frequency division multiplexing (OFDM) communication system.

17. The method of claim 10 wherein the receiving station and the second of the plurality of sending stations are part of a wireless communications system and the receiving station and the second of the plurality of sending stations are positioned so that direct line of sight between the receiving station and the second of the plurality of sending stations is not possible, the second of the plurality of sending stations utilizing an orthogonal frequency division multiplexing (OFDM) non-line-of-sight (NLOS) communication to transmit the substantially isochronous data to the receiving station.

18. The method of claim 10 wherein scheduling a transmission time, communicating the scheduled transmission time, receiving a request from a second of the plurality of sending stations, interrupting the scheduled transmission time are controlled by a media access control (MAC) layer communication protocol.

19. A method for scheduling polling in a contention-based communication system having a sending station and a receiving station, comprising:

requesting a transmission time for the sending station to transmit a datagram to the receiving station;

monitoring a number of datagrams awaiting transmission from the sending station to the receiving station;

determining a polling rate value based on the number of datagrams awaiting transmission;

sending data related to the polling rate value to the receiving station;

transmitting a datagram to the receiving station at a polling rate based on the polling rate value received from the sending station;

adjusting the polling rate value to increase the polling rate if the number of datagrams awaiting transmission increases above a first predetermined threshold; and adjusting the polling rate value to decrease the polling rate if the number of datagrams awaiting transmission decreases below a second predetermined threshold.

20. The method of claim 19 wherein receiving station receives datagrams in data frames defined by a data-link layer, and the polling rate indicates a number of data frames until the receiving station will poll the sending station to transmit a datagram awaiting transmission.

21. The method of claim 19 wherein the data related to the polling rate value is substantially equal to the polling rate value determined by the sending station.

22. The method of claim 19 wherein the data related to the polling rate value is greater than the polling rate value determined by the sending station if the number of datagrams awaiting transmission increases above the first predetermined threshold by a predetermined amount.

23. A system for isochronous datagram delivery in a contention-based communication system having a plurality of sending stations, each having a communications control device, comprising:

a receiving station having a communications control device capable of communicating with the plurality of sending stations; and a receiving station scheduler configured to schedule a transmission time for a first of the plurality of sending stations;

wherein the receiving station communications control device is configured to receive a request from a second of the plurality of sending stations to transmit a substantially isochronous datagram, wherein the receiving station scheduler is further configured to interrupt the scheduled transmission time reserved for transmission of data by the first of the plurality of sending stations, and during the interruption, the receiving station communications control device is configured to receive the substantially isochronous datagram from the second of the plurality of sending stations to the receiving station.

24. The system of claim 23 wherein the receiving station scheduler is further configured to restore the interrupted scheduled transmission time reserved for transmission of data by the first of the plurality of sending stations following the interruption.

25. The system of claim 24 wherein the receiving station communications control device is further configured to resuming reception of the data transmitted by the interrupted first of the plurality of sending stations following the interruption.

26. The system of claim 23 wherein the receiving station communications control device is further configured to receive polling rate data from the second of the plurality of sending stations, the receiving station scheduler being configured to use the polling rate data to establish a polling rate at which the receiving station will poll the second of the plurality of sending stations to transmit the substantially isochronous data to the receiving station.

27. The system of claim 26 wherein the polling rate data is transmitted from the second of the plurality of sending stations to the receiving station as part of the substantially isochronous data, the receiving station communications control device extracting the polling rate data.

28. The system of claim 23 wherein the receiving station is part of a wired communications system and the receiving station communications control device is a network interface adapter.

29. The system of claim 23 wherein the receiving station is part of a wireless communications system and the receiving station communications control device comprises a transmitter circuit and a receiver circuit.

30. The system of claim 23 wherein the receiving station communications control device is configured to receive orthogonal frequency division multiplexing (OFDM) data transmitted by the second of the plurality of sending stations.

31. The system of claim 23 wherein the receiving station and the second of the plurality of sending stations are part of a wireless communications system and the receiving station and the second of the plurality of sending stations are positioned so that direct line of sight between the receiving station and the second of the plurality of sending stations is not possible, the receiving station communications device comprising a receiver circuit configured to receive the substantially isochronous data via non-line-of-sight (NLOS) communication.

32. The system of claim 23 wherein the receiving station and the second of the plurality of sending stations are part of a wireless communications system and the receiving station and the second of the plurality of sending stations are positioned so that direct line of sight between the receiving station and the second of the plurality of sending stations is not possible, the communications device comprising a transmitter circuit configured to transmit the substantially isochronous data via non-line-of-sight (NLOS) communication to the receiving station.

33. A system for isochronous datagram delivery in a contention-based communication system with a receiving station having a communications control device, comprising:
 plurality of sending stations, each having a communications control device capable of communicating with the receiving station;
 a first of the plurality of sending stations having a scheduled transmission time for transmitting data to the receiving station; and
 a second of the plurality of sending stations configured to transmit a request to send a substantially isochronous datagram to the receiving station;
 wherein the second of the plurality of sending stations is configured to respond to a poll from the receiving station received by the second sending station communications control device by transmitting a substantially isochronous datagram to the receiving station during the transmission time scheduled for the first of the plurality of sending stations.

34. The system of claim 33 wherein the first of the plurality of sending stations is configured to respond to the poll from the receiving station received by the first sending station communications control device by suspending transmission of data to the receiving station during the interruption.

35. The system of claim 33 wherein the first of the plurality of sending stations is further configured to restore the interrupted scheduled transmission time reserved for transmission of data by the first of the plurality of sending stations following the interruption.

36. The system of claim 33 wherein the communications control device of the second of the plurality of sending stations is further configured to transmit polling rate data to the receiving station to establish a polling rate at which the receiving station will poll the second of the plurality of sending stations to transmit the substantially isochronous data to the receiving station.

37. The system of claim 36 wherein the second of the plurality of sending stations is further configured to adjust the polling rate data, the communications control device of the second of the plurality of sending stations transmitting adjusted polling rate data to the receiving station.

38. The system of claim 36 wherein the communications control device of the second of the plurality of sending stations transmits the polling rate data to the receiving station as part of the substantially isochronous data.

39. The system of claim 33 wherein the second of the plurality of sending stations is part of a wired communications system and the communications control device of the second of the plurality of sending stations is a network interface adapter.

40. The system of claim 33 wherein the second of the plurality of sending stations is part of a wireless communications system and the communications control device of the second of the plurality of sending stations comprises a transmitter circuit and a receiver circuit.

41. The system of claim 33 wherein the communications control device of the second of the plurality of sending stations is configured to transmit orthogonal frequency division multiplexing (OFDM) data to the receiving station.

* * * * *